Patented Aug. 24, 1926.

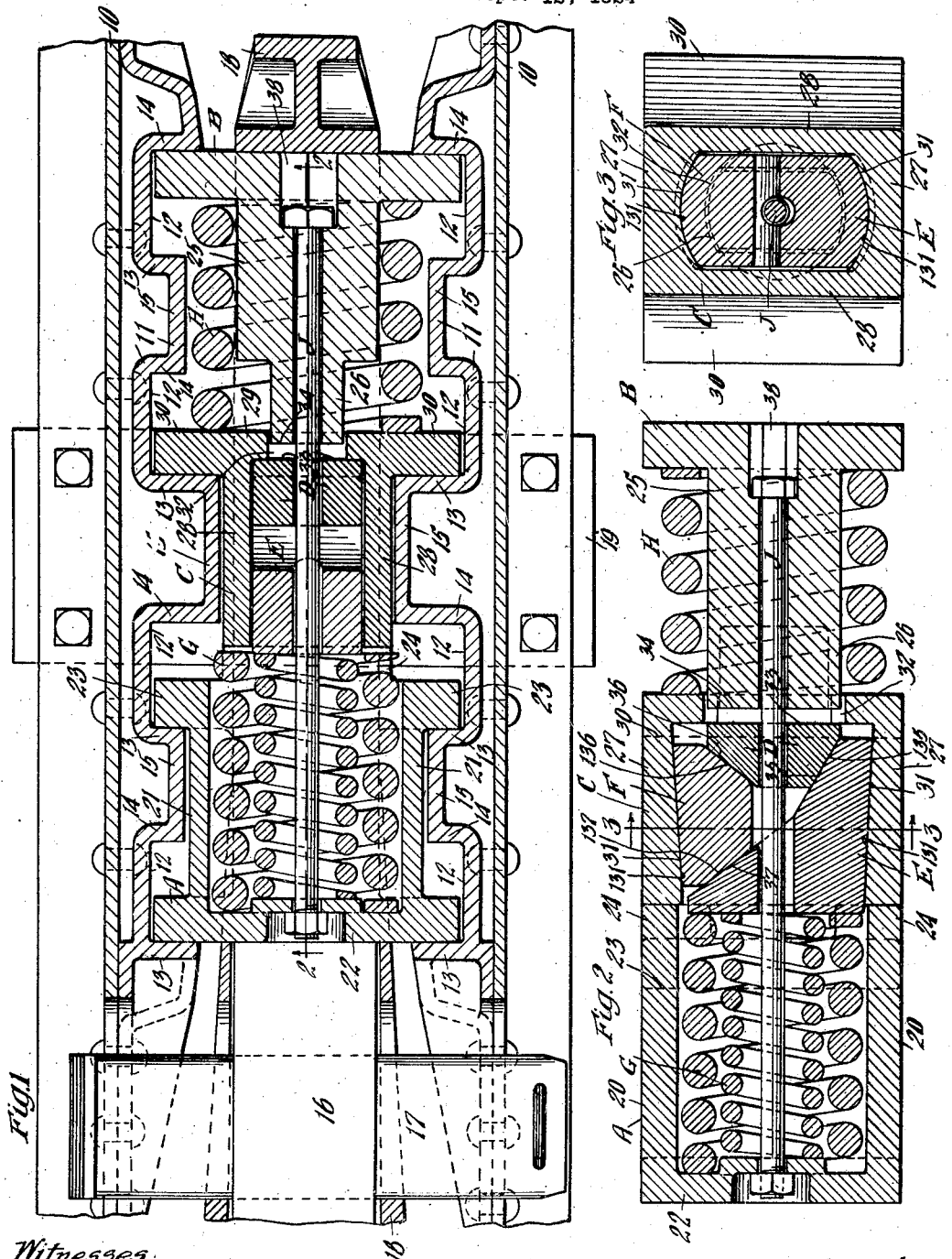

1,597,462

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 12, 1924. Serial No. 737,352.

This invention relates to improvements in friction shock absorbing mechanisms.

One object of the invention is to provide a friction shock absorbing mechanism more particularly adapted for railway draft riggings, having relatively heavy spring capacity, together with additional friction resistance, wherein the spring resistance is at all times effective to restore the follower elements to normal position.

Another object of the invention is to provide a friction shock absorbing mechanism of the character indicated, including a friction system wherein a lateral pressure creating means having the attributes of a blunt and keen angle wedge system is made use of to assure quick and easy release of the friction system.

Still another object of the invention is to provide a mechanism of the type referred to, having combined spring and frictional resistance, wherein the spring resistance means is effective to restore the follower acting means after each compression stroke and thus be available to absorb the succeeding shocks.

A further object of the invention is to provide a friction shock absorbing mechanism of the character indicated, having preliminary spring resistance followed by a combined heavier spring and frictional resistance during the remainder of the compression stroke.

Other objects and advantages of the invention will more clearly and fully appear from the description and claims hereinafter following.

In the drawing forming a part of this specification, Figure 1 is a longitudinal, horizontal, sectional view of a portion of a railway draft rigging, showing my improvements in connection therewith. Figure 2 is a longitudinal, vertical, sectional view of the shock absorbing mechanism proper, corresponding substantially to the line 2—2 of Figure 1. And Figure 3 is a transverse, vertical, sectional view corresponding substantially to the line 3—3 of Figure 2.

In said drawings, 10—10 indicate channel-shaped center or draft sills of a railway car underframe, to the inner faces of which are secured tandem stop castings 11—11 each provided with the usual four, longitudinally spaced pockets 12—12 at either side the center thereof, each presenting a pair of opposed stop shoulders 13 and 14. Between each adjacent pair of pockets 12, the stop castings are provided with inner, longitudinal walls 15, the wall 15 midway the ends of the casting being offset laterally inwardly toward the axis of the mechanism with reference to the remaining walls, for a purpose hereinafter described. The inner end of the draw-bar is indicated at 16, to which is operatively secured by means of the usual key 17, the yoke 18, the key working in longitudinally elongated aligned openings provided in the yoke and the draft sills. The shock absorbing mechanism proper is disposed within the yoke and the latter is supported by a detachable saddle plate 19.

The improved shock absorbing mechanism proper, as shown, comprises broadly, a front follower casing A; a rear follower member B; a central friction shell C; a central wedge block D; wedge shoes E and F; a front main spring resistance element G; a rear spring resistance element H; and a retainer bolt J.

The front follower casing A is of generally cylindrical form on its inner contour, its exterior having spaced, parallel, flat, top and bottom faces 20—20 and cylindrical portions 21—21 therebetween, and a transverse front end wall 22. The front end wall 22 is adapted to co-act with the rear end of the drawbar 16 and is extended laterally beyond the side walls 21 to co-operate with the stop shoulders 13 and 14 of the pocket at the front end of the stop castings in the manner of the usual follower. At the inner end, the casing A is provided with lateral flanges 23—23 adapted to co-act with the stop shoulders 13 and 14 of the innermost pocket of the front set. The top and bottom walls 20 of the casing A extend rearwardly beyond the remainder of the casing as indicated at 24 to engage the front end of the friction shell C.

The rear follower member B is in the form of a heavy, rectangular plate co-operating with the corresponding stop shoulders 13 and 14 of the rearmost pockets 12 of the stop castings and has a central post 25 formed integral therewith and projecting forwardly therefrom. At the front end the post 25 is cut away at opposite sides to provide a reduced extension 26 adapted to co-operate with the wedge friction system comprising the elements D, E and F.

The friction shell C is in the form of a rectangular, box-like casting and has spaced top and bottom walls 27—27, spaced side walls 28—28, and a transverse rear end wall 29. The end wall 29 is extended laterally beyond the side walls 28 to provide flanges 30 adapted to co-operate with the stop shoulders 13 and 14 of the corresponding pockets in the manner of a rear intermediate follower. The inner surfaces of the top and bottom walls 27 of the casing C are of cylindrical contour and converge forwardly of the mechanism presenting opposed interior friction surfaces 31—31 with which the wedge shoes E and F are adapted to co-operate. The end wall 29 is provided with a central opening 32 corresponding in outline to the cross-section of the reduced extension 26 of the post 25 and is adapted to receive the end of the post for free working movement therein. It will be evident that the end wall 29 immediately adjacent the opening 32 presents a continuous interior flat abutment face along the top, bottom and sides of the casing, adapted to co-operate with the wedge block D. Upon reference to Figure 1, it will be seen that the friction shell A is of such a width that it has free working movement between the offset central walls 15 of the stop castings, the walls 15 forming guide means for the shell.

The central wedge element D is preferably in the form of a block having a rear flat face 33 adapted to co-act with the flat end face 34 of the extension 26 of the post 25. As clearly shown in Figure 1, in the normal position of the parts the front end face 34 of the post is spaced slightly from the face 33 of the block to permit of preliminary action of the mechanism. The block is also provided with a wedge face 35 extending at a relatively keen angle with reference to the longitudinal axis of the mechanism and at the opposite side with a wedge face 36 extending at a relatively blunt angle with reference to said axis.

The wedge friction shoe E is preferably in the form of a block and is formed at its outer side with a longitudinally extending cylindrical friction surface 131 correspondingly inclined to the lower friction surface 31 of the casing C and adapted to co-operate therewith. The element E is also provided with a wedge face 135 extending at the same angle, and cooperable with the wedge face 35 of the wedge block D at one side of the horizontal center line of the mechanism, and with an additional inclined face 37 on the other side of the center line of the mechanism, said face 37 extending at a relatively blunt angle with reference to the longitudinal axis of the mechanism and co-acting with the front end of the wedge friction shoe F. At the front end, the wedge shoe E is provided with a flat, transverse face co-acting with the spring resistance G, the latter being interposed between said wedge friction shoe and the end wall 22 of the casing A, and the shoe acting in the manner of a front intermediate follower.

The friction wedge shoe F, which is also preferably in the form of a block, is provided on its outer side with a cylindrical friction surface indicated by 131 and adapted to co-operate with the friction surface 31 at the top of the shell C. On the inner side, that is the side nearest the axis of the mechanism, the friction shoe F is formed with rear and front wedge faces 136 and 137 correspondingly inclined to and adapted to co-operate respectively with the wedge faces 36 and 37.

The spring resistance G is disposed within the casing A and comprises a relatively light inner coil and a heavier outer coil having their front and rear ends bearing respectively on the inner surface of the end wall of the casing A and the front end of the wedge friction shoe E. The rear spring resistance element H consists of a single relatively heavy coil surrounding the post 25 and has its front and rear ends bearing respectively on the rear end of the shell C and the front face of the plate-like portion of the follower B.

The parts of the mechanism are held in assembled relation and under initial compression by the retainer bolt J extending through the inner coil of the spring resistance G and aligned openings in the post 25, wedge block D, wedge friction shoe E, and the casing A, the front and rear ends of the bolt being anchored respectively to the wall 22 of the casing A and the post 25 of the follower member B, the follower member B being provided with an elongated opening 38 adapted to accommodate the head of the bolt for limited sliding movement to allow for the necessary compression of the mechanism.

As the various friction and wedge surfaces become worn, compensation therefor is had by the expansive action of the spring resistance G which is under initial compression as hereinbefore described.

When the parts are in the normal, full release position as clearly shown in Figure 1, the casing A and the follower member B are held in their outermost position by the spring resistance elements, in engagement with the respective stop shoulders 13 and 14, and the friction shell C has the flanges 30 thereof in engagement with the stop shoulder 13 of the innermost of the rear pockets 121, and the front end of the shell in engagement with the arms 24 of the casing A.

Assuming an inward or buffing movement of the drawbar, the operation of the improved shock absorbing mechanism is as follows. The front follower casing A will be forced inwardly by the rearward movement of the drawbar, forcing the friction shell C rearwardly therewith and compressing the rear spring resistance H between the shell and the follower member B. The described action will continue until the front end of the post 25 is brought into engagement with the wedge block D, arresting movement of the latter. Continued inward movement of the casing A and the shell C will effect a relative movement between the shell and the wedge block D and also compress the spring resistance element G between the end wall of the casing A and the friction wedge block E. As pressure is thus applied to the element D, the initial tendency is for the same to slip or move on the keen wedge face 135 of the shoe E, it being evident that this will produce a spreading laterally of the friction unit consisting of the three elements D, E and F. As the three elements D, E and F, co-operating as a unit, move inwardly of the shell C, the shoes E and F travel along the inclined faces 31, thereby producing a lateral inward movement of the shoes E and F with respect to the remaining element D. This lateral movement of the elements E and F produces a separating wedge action between the two elements D and E, thereby slightly elongating the unit in the direction of the applied force and creating a very high resistance between the unit and the friction shell. It is of course understood that resistance is offered the entire unit by the spring element G and that the spring is compressed between the wall 22 of the front follower and the shoe E which functions as an intermediate follower. In this connection, it will be obvious that the sets of inclined faces 36, 136, 37, 137, on account of their relative blunt angularity with respect to the center line of the mechanism, will readily accommodate the action above described and will act in the manner of a safety device to prevent bursting of the shell while the highest frictional resistance is still maintained. The described action of the mechanism will continue until the actuating pressure is reduced or until the stop shoulders 14 limit the movement of the casing A and friction shell C respectively.

During draft the action will be substantially the reverse of that just described, the casing A and the friction shell C being held stationary by the stop shoulders 13 while the rear follower B is moved toward the shell C, the post thereof being brought into engagement with the wedge block D after the preliminary action required to take up the space between these two parts and thereafter will actuate the wedge friction system and effect compression of the spring G in addition to the compression of the spring H in the manner hereinbefore described.

Upon reduction of the actuating force, the front and rear spring resistance elements G and H will be free to independently return the front follower casing A, rear follower member B and the shell C independent of the release of the friction wedge system, inasmuch as the casing A is separate and distinct from the shell C and the latter is arranged to float between the casing A and the post 25 of the follower B. Upon reduction of the pressure as described, the wedge D will readily release itself with respect to the shoes E and F on account of the obtuse or blunt included angle between the wedge faces 135 and the inclined face 136 of the two shoes. This movement of the pressure wedge element D with respect to the shoes, in turn serves to permit collapse of the entire unit which may then be projected rearwardly with reference to the shell C by the action of the spring resistance G.

I have herein shown and described what I now consider the preferred manner of carrying out my invention, but the same is merely illustrative, and I contemplate all changes and modifications that come within the scope of the claims appended hereto.

I claim:

1. In a shock absorbing mechanism, the combination with a front follower casing; of a rear follower member having a post thereon; a floating friction shell interposed between said front follower casing and said rear follower member, said shell being adapted to be engaged and actuated by said casing; a friction wedge system disposed within the shell and co-operating therewith, said system being adapted to be engaged and actuated by the post of said rear follower member during compression of the mechanism; and tandem arranged spring resistance elements, one of said elements being interposed between the friction wedge system and the front follower casing and the other being interposed between the friction shell and said rear follower member.

2. In a shock absorbing mechanism, the combination with front and rear outer and front and rear intermediate follower acting means; of tandem arranged spring resistance elements co-operating with said follower acting means; and means for transmitting the actuating forces from said outer to said intermediate followers, said means including a friction shell having interior converging friction surfaces, friction wedge shoes co-operating with said shell and a wedge member co-operating with said shoes, said wedge member having a wedge face co-operating with one of said shoes, said face being disposed at a relatively keen wedge acting angle with reference to the longitudinal axis of the mechanism, and a second wedge face co-operating with the remaining shoe, said last named face being disposed at a relatively blunt angle to said axis, said shoes having co-operating wedge faces also disposed at a relatively blunt angle with reference to said axis.

3. In a shock absorbing mechanism, the combination with side castings having front and rear sets of stop shoulders and front and rear intermediate sets of stop shoulders; of front and rear intermediate follower-acting means co-operating with said front and rear sets of stop shoulders and said front and rear intermediate sets of stop shoulders respectively; a spring resistance interposed between said outer front and intermediate follower acting means; a second spring resistance interposed between said rear outer and intermediate follower acting means; means for transmitting the actuating force from said outer front follower means to said intermediate rear follower means; and means for transmitting the actuating force from said rear outer follower means to said front intermediate follower means, one of said actuating force transmitting means, including a friction shell and the other of said actuating force transmitting means including a friction wedge system co-operating with the friction shell.

4. In a shock absorbing mechanism, the combination with front and rear sets of inner and outer stop shoulders and intermediate sets of inner and outer stop shoulders; of front and rear followers, said followers co-operating with said front and rear stop shoulders, each follower having a pressure transmitting member associated therewith, said members being movable in unison with said followers and one of said members having intermediate follower means thereon co-operating with one set of intermediate stop shoulders; a friction shell having intermediate follower means thereon co-operating with the other set of intermediate stop shoulders; a friction wedge system co-operating with the friction shell; a spring resistance interposed between said wedge system and one of said followers, said follower being adapted to engage and actuate the friction shell; a second spring resistance interposed between the remaining follower and the friction shell, the pressure transmitting member of said last-named follower being adapted to engage and actuate the friction wedge system upon compression of the mechanism.

In witness that I claim the foregoing I have hereunto subscribed my name this 10th day of September, 1924.

STACY B. HASELTINE.